Nov. 20, 1928.
G. DALÉN
1,692,629
ELECTRIC FLASH LIGHT APPARATUS
Filed July 10, 1923    2 Sheets-Sheet 1
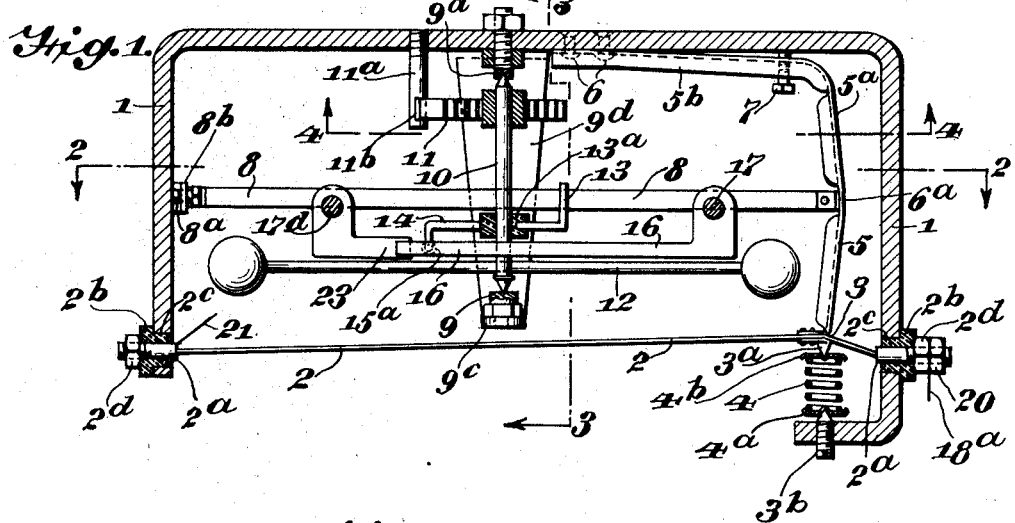
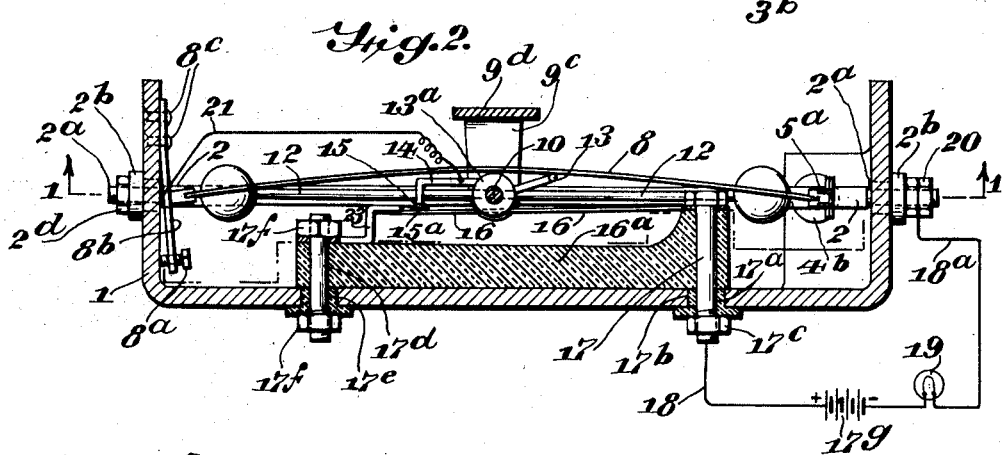
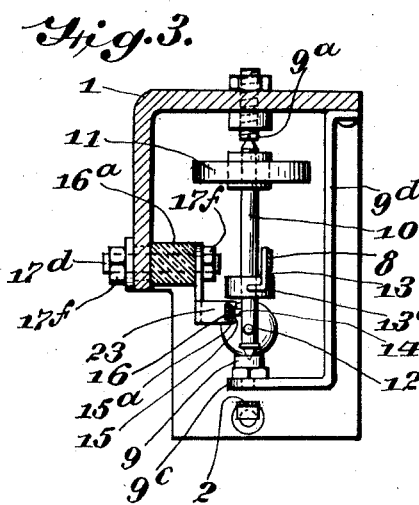
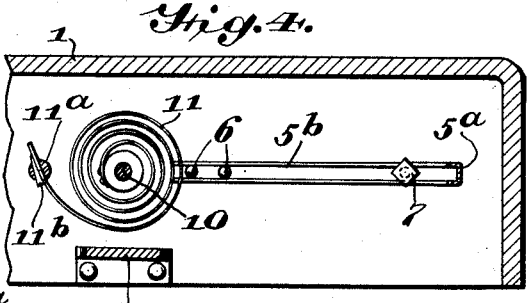
INVENTOR.
Gustaf Dalén
BY
Cyrus W. Anderson
ATTORNEY.

Nov. 20, 1928.

G. DALÉN 1,692,629

ELECTRIC FLASH LIGHT APPARATUS

Filed July 10, 1923   2 Sheets-Sheet 2

INVENTOR.
Gustaf Dalén
BY
Cyrus N. Anderson
ATTORNEY.

Patented Nov. 20, 1928.

1,692,629

UNITED STATES PATENT OFFICE.

GUSTAF DALÉN, OF STOCKHOLM, SWEDEN, ASSIGNOR TO AMERICAN GASACCUMULATOR COMPANY, OF ELIZABETH, NEW JERSEY, A CORPORATION OF NEW JERSEY.

ELECTRIC FLASH-LIGHT APPARATUS.

Application filed July 10, 1923, Serial No. 650,588, and in Sweden July 12, 1922.

The present invention relates to electric flash light apparatus by means of which alternate periods of light and darkness are produced by the alternate closing and opening of an electric circuit within which the lighting element is included.

The general object of the invention is to provide an apparatus for the purpose indicated having means whereby the passage of current through the circuit including the lighting element is adapted to effect opening of the circuit and means whereby immediately thereafter the circuit is again closed, whereupon the operation of opening the circuit is repeated, and so on continuously.

It is also an object of the invention to provide a novel construction of apparatus of the character indicated in which the circuit which includes the light comprises a member which is adapted to be expanded upon the passage of current through the said circuit to permit the actuation of means for opening or breaking the said circuit, whereupon the current therethrough is interrupted, whereby the said member is adapted to contract and to permit reclosing of said circuit.

Another object of the invention is to provide an apparatus of the character indicated comprising a pendulum or balance device associated with means by which it is operated, which means is actuated and controlled by the passage of current through a circuit, which circuit is adapted to be opened and closed by the operation of the said pendulum or balance device.

Other objects and advantages of the invention will be pointed out in the detailed description thereof which follows, or will be apparent from such description.

In order that the invention may be readily understood and its practical advantages fully appreciated, reference should be had to the accompanying drawings, in which I have illustrated certain forms of convenient mechanical embodiments thereof. However, it will be understood that the invention is susceptible of embodiment in forms of construction other than those shown and that changes in the details of construction may be made within the scope of the claims without departing from the principle of the invention.

In the drawings:

Fig. 1 is a view in vertical section of an apparatus embodying my invention, certain of the parts being shown in elevation, the said view being taken on the line 1—1 of Fig. 2;

Fig. 2 is a horizontal sectional view taken on the line 2—2 of Fig. 1, looking down;

Fig. 3 is a transverse sectional view taken on the line 3—3 of Fig. 1;

Fig. 4 is a horizontal sectional view taken on the line 4—4 of Fig. 1, looking upward, showing more clearly certain details of construction;

Figure 5:
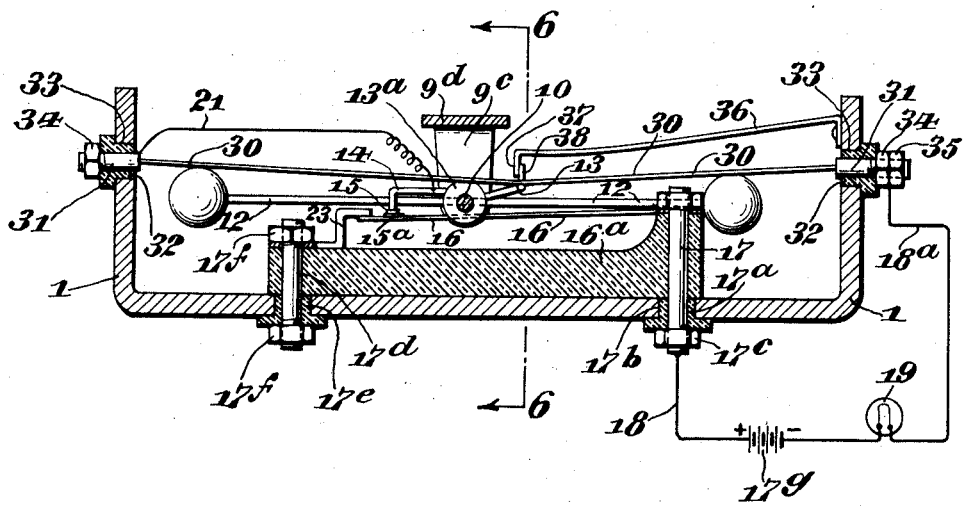
Fig. 5 is a horizontal sectional view, similar to Fig. 2, showing a modified construction of apparatus embodying the invention.

In Figs. 1 to 4 of the drawings I have shown one form of construction embodying my invention, in which the casing is indicated at 1. Extending between the opposite end walls of the casing is a flexible wire 2, the opposite ends of which are connected by soldering, or otherwise, to enlarged portions $2^a$ which are mounted in openings through plugs $2^b$ of insulating material, which are supported in openings $2^c$ in the end walls of the casing 1. In the construction as shown, the wire 2 is in the form of a flat strip, but it will be understood that it may be of any other desired or preferred shape in cross section. The outer ends of the enlarged portions $2^a$ are screw threaded for the reception of nuts $2^d$ by means of which the said enlarged portions and the flat wire or strip 2 are retained in place. The wire 2 is provided with a bend, as indicated at 3, at which point a downwardly extending pointed member $3^a$ is secured. Located between the pointed member $3^a$ and a pointed adjustable screw $3^b$ is a coiled spring 4, the lower end of which is supported upon a plate $4^a$, which in turn is supported upon the pointed upper end of the screw $3^b$, while the upper end of said spring bears against a bearing plate $4^b$, which bearing plate is pressed upwardly against the pointed end of the member $3^a$. The spring 4 exerts constant pressure through the pointed member $3^a$ against the flat wire or strip 2. A knee plate or lever comprising parts 5 and $5^a$ is connected at its lower end to the wire or strip 2. The connection is made at the bend 3 therein, previously referred to. The upper end of the knee plate or lever is provided with an extension 5$^b$ which is connected by means of rivets at 6 to the top wall of the casing 1. It will be noted that the knee lever or plate is adapted to be bent at 6$^a$. An adjustable screw 7 is in screw-threaded engagement with the extension 5$^b$ near its outer end. The outer or upper end of the said screw 7 is in contact with the adjacent inner surface of the top wall of the casing 1, and by adjusting the said screw the outer end of the portion 5$^b$ is adapted to be raised or lowered. By raising or lowering the same the angle at the bend 6$^a$ between the parts 5 and 5$^a$ may be varied.

A flexible strip 8 is connected at one end to the knee plate or lever at the bend 6$^a$. The opposite end of the said strip is connected to a horizontally extending flexible bar 8$^b$, which is secured by rivets 8$^c$ to the opposite end wall of the casing 1. The forward end portion of the bar 8$^b$ is adapted to be adjusted by means of an adjustable screw 8$^a$, having engagement therewith. The outer end of said screw is in contact with the adjacent inner surface of the adjacent end wall. By adjusting the screw 8$^a$ the amount of curvature of the strip 8 may be varied. The central portion of the strip is located in adjacent relation to a vertical rotatable shaft 10, the opposite ends of which are pointed and are supported in bearings 9 and 9$^a$. The bearing 9 is supported upon a horizontally extending projection 9$^c$, which extends forwardly from a bracket 9$^d$, secured at its upper end to the top wall of the casing 1. The bearing 9$^a$ is adjustable and is supported upon the top wall of said casing. A coiled spring 11 is connected at one end to the upper portion of the shaft 10 and at its opposite end to an anchor post 11$^a$, which depends from the top wall of the casing 1. The spring extends through a slot in the lower end of said anchor post and may be adjusted therein for the purpose of varying its tension, and is held in adjusted position by means of a wedge 11$^b$. The tendency of the said spring is to turn the shaft 10 in an anti-clockwise direction, so that an upwardly extending portion of an arm 13, mounted upon the shaft 10 near its lower end, may be held in contact with the strip 8. The arm 13 is connected to a sleeve 13$^a$ of insulating material, secured upon the shaft 10. An arm 14 is likewise secured to the said sleeve 13$^a$ of insulating material and is provided at its outer swinging end with an offset portion, upon which is secured a contact element 15, which is adapted to contact with a contact element 15$^a$ upon a flexible metal strip 16. The strip 16 is supported upon one end portion of an insulating block or member 16$^a$, to which it is secured by means of a headed bolt 17, which extends through an opening through the said insulating block and through an opening through a plug 17$^a$ of insulating material, which is mounted within an opening 17$^b$ in a side wall of the casing 1. The bolt 17 is held in position, with its head clamped against the outer end portion of the flexible metal strip 16, by means of a nut 17$^c$.

The opposite end of the insulating block 16$^a$ is held by means of a bolt 17$^d$ which extends through an opening therethrough, and also through an opening through an insulating plug 17$^e$, mounted in an opening in the said side wall of the casing 1. The bolt 17$^d$ is secured and fastened in position by means of nuts 17$^f$ upon its opposite ends. Between the inner nut 17$^f$ and the insulating block 16$^a$ a bracket 23 is secured, the inner end of which constitutes a stop for limiting the lateral inward movement of the inner free end of the flexible strip 16, previously referred to. A horizontal pendulum or governor 12 is secured to the shaft 10 adjacent its lower end.

A battery 17$^g$ supplies current to the circuit which comprises in part the lines 18 and 18$^a$, within which latter an electric light 19 is provided. One end of the line 18$^a$ is connected with one of the enlargements 2$^a$, previously referred to, and is held thereon by a clamping nut 20. The said circuit also includes the conducting line 21, one end of which is connected to the arm 14, while the other end thereof is connected to the enlargement 2$^a$ at the opposite end of the wire 2. The circuit and the flow of current therethrough may be traced as follows: through the line 18, the bolt 17, the flexible metal strip 16, the arm 14, the line 21 to the wire or strip 2, and thence to the line 18$^a$, back to the negative side of the battery 17$^g$.

The wire 2 is of small area in cross section. The passage of current therethrough effects heating thereof and consequent linear expansion. Such heating and expansion of the said wire takes place immediately upon the passage of electric current therethrough. Immediately upon such expansion the spring 4 expands so as to take up the slack due to the linear expansion of the wire 2 and in so doing further bends the knee lever or plate to decrease the angle between the parts 5 and 5$^a$ of said knee lever or plate. Such further bending operates to stretch the strip 8 and slightly decrease the curvature thereof. This action takes place very quickly. Such straightening or decreasing of the curvature of the strip 8 operates through the arm 13 to impose upon the shaft 10 an impulse of rotation in a clockwise direction. Such impulse of rotation imparts rotative movement to the pendulum 12 which, due to its momentum, continues to rotate through a short distance against and in opposition to the tension of the coiled spring 11. Such movement of the shaft 10 causes movement of the contact element 15 away from the contact element 15$^a$, so as to interrupt the flow of current through the circuit. Such interruption permits the wire 2 to cool and to contract to its normal length. The spring 11 operates to return the shaft 10 and the pendulum 12 to normal position, as illustrated in the drawing, so that the contact element 15 is again caused to contact with the contact element 15ª, whereupon the circuit is again closed and current flows, as above described, which reheats the wire 2 to cause linear expansion thereof, and the operation is repeated, and so on continuously.

Figure 6:
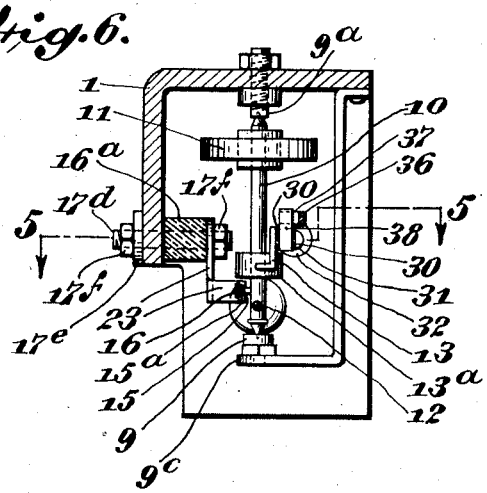
Fig. 6 is a transverse vertical sectional view taken on the line 6—6 of Fig. 5.

Referring now to the construction shown in Figs. 5 and 6, it will be noted that the parts 1, 9, 9ª, 9ᶜ, 9ᵈ, 10, 11, 12, 13, 13ª, 14, 15, 15ª, 16, 17, 17ª, 17ᵇ, 17ᶜ, 17ᵈ, 17ᵉ, 17ᶠ, 17ᵍ, 18, 18ª, 19, 21 and 23 are identical with the parts correspondingly numbered in the previous figures of the drawings.

Several of the parts to which I shall now refer in the description of these two figures are identical with the parts 2, 2ª and 2ᵈ, previously referred to, but as they are employed and operate in a somewhat different manner it is deemed desirable that they be referred to by different reference numbers. The wire 30, which may be identical in form with the wire 2, is connected at its opposite ends to the enlargements 31, which extend through openings in plugs 32 of insulating material, which are mounted in openings 33 in the end walls of the casing 1. The outer ends of the enlargements 31 are screw threaded and are provided with nuts 34, by means of which they are retained in the openings through the plugs 32 of insulating material. These nuts may be adjusted so as to cause outward movement of the enlarged portions 31, or to permit inward movement thereof, if desired. By the adjustment of these nuts the condition of the wire 30 as to straightness may be controlled. The conducting line 18ª is secured to one of the enlargements 31 by means of a clamping nut 35. It will be noted that as shown in the drawings the wire 30 is characterized by a certain amount of slackness. A spring plate 36 is secured at its outer end to one of the end walls of the casing 1, and at its inner end is provided with an inwardly extending portion 37, to which is secured a portion 38 which contacts with the wire 30 and presses it inwardly toward the contact portion of the arm 13. The contact portion of the latter and the portion 38 are located in oppositely disposed relation to each other upon opposite sides of the wire 30, and in contact therewith.

The circuit in this construction is completed in exactly the same manner as described in connection with the previous figures of the drawings. Upon the flow of electric current through the circuit the wire 30 is heated very quickly, as a result of which linear expansion takes place, causing additional slack in the said wire. Thereupon the spring 36 operates instantaneously to move the central portion of the said wire inwardly and through the arm 13 to impose upon the shaft 10 an impulse of rotation, whereupon identically the same operation as described in connection with the construction disclosed in the preceding figures of the drawings ensues.

It will be seen that by my invention I have provided an apparatus of simple construction by means of which flashes of light and periods of darkness may be caused to occur alternately for any purpose desired.

Having thus described my invention, what I claim and desire to secure by Letters Patent is:

1. An electric flash light apparatus, comprising, in combination, a member adapted to be heated by an electric current, a switch device, a movable support for said switch device which support is adapted to be actuated by said member, a spring connected to said support and adapted to rotate the same, and a pendulum device mounted upon said movable support and operating in conjunction with the said spring to regulate the movements of said support and of the said switch device, the said switch device being included within a circuit including an electric lamp.

2. An electric flash light apparatus, comprising, in combination, a member adapted to undergo deformation by the action of an electric current thereon, a switch device, a rotatable support for said switch device, a pendulum device mounted on said support, means interposed between said member and said rotatable support whereby deformation of said member operates to actuate said support together with the pendulum device thereon, the latter operating to regulate the movements of said support and switch device, the said switch device being located within a circuit including an electric lamp.

3. A switch structure for an electric flash light apparatus, comprising, in combination, a wire having a bend therein, which wire is included within the electric light circuit, a knee lever system having connection with said wire at the said bend, a pendulum device which is adapted to be actuated by the said knee lever system, and a switch adapted to be operated by the said pendulum device.

4. A switch structure for an electric flash light apparatus, comprising, in combination, a wire having an adjustable bend therein, which wire is included within the electric light circuit, a pendulum device, a lever system interposed between the said wire and the said pendulum device for actuating the latter, and a switch device adapted to be actuated by the said pendulum device for controlling the said circuit.

5. A switch structure for an electric flash light apparatus, comprising, in combination, a wire which is adapted to expand linearly upon a flow of current therethrough, which wire is included within the electric light circuit, a rotatable member, means tending to cause rotation of said rotatable member in one direction, means intermediate the said wire and the said rotatable member and having operative connection with the latter, which means is adapted to operate upon the expansion of said wire to cause rotation of said rotatable member in a direction opposite to that in which it is tending to rotate, and a switch device adapted to be controlled by the rotation of the said rotatable member for opening and closing said circuit.

6. A switch structure for an electric flash light apparatus, comprising, in combination, a wire which is adapted to be expanded upon a flow of electric current therethrough which wire is included within the electric light circuit, a rotatable shaft, means whereby upon expansion of said wire the said shaft is given an impulse of rotation, means for causing a continuance of said movement of rotation, means for returning the said shaft and the last mentioned means to normal position, and a switch adapted to be controlled by the rotation of said shaft to open and close the said circuit.

7. A switch structure for an electric flash light apparatus, comprising, in combination, a wire which upon a flow of current therethrough is heated and thereby caused to expand linearly, which wire is included within the electric light circuit, a knee lever having connection with said wire, a flexible strip having connection at one end to the said knee lever at the bend therein and at its opposite end to a stationary anchorage, the said flexible strip being normally of curvilinear shape, means which is adapted to operate upon the heating of said wire to increase the bend in said knee lever to effect straightening movement of said flexible strip, a rotatable member, means interposed between the said member and said flexible strip whereby upon the straightening movement of the latter rotation of said rotatable member in one direction is caused, means for causing rotation of said member in the opposite direction to return the same to normal position, and a switch adapted to be controlled by rotation of said member for opening and closing the said circuit.

8. A switch structure for electric flash light apparatus comprising, in combination, a wire which wire is included within the electric light circuit and which is adapted to expand and contract upon the intermittent flow of electric current therethrough, a knee lever having connection with said wire at a point intermediate its ends, yielding means which exerts pressure against said wire at a point opposite the point of connection of the said knee lever thereto, a rotatable member, a switch device mounted upon said rotatable member, a curved strip having connection at one end to a stationary support and at its opposite end to an intermediate portion of the said knee lever, the said strip extending transversely of and in spaced relation to the said rotatable member, and the said strip being extended upon the expansion of the said wire to cause lateral movement of the intermediate portion thereof toward the said rotatable member, and means interposed between the said strip and the said rotatable member whereby rotation of the latter is effected upon extension of the said strip to move the said switch member into open position.

9. A switch structure for an electric flash light apparatus comprising, in combination, a rotatable support, a switch device mounted upon said support, said switch device being adapted to open and close the electric light circuit of the said apparatus, yielding means for holding said support in position to close the said switch device, a bent strip extending transversely of and in spaced relation to the said support, means mounted upon the said support and contacting with the concaved side of the said strip, and means operating immediately upon the passage of a current through the circuit controlled by the said switch to cause a quick straightening movement of the said strip to effect rotation of the said rotatable support in a direction to open the said switch member.

10. A switch structure for an electric flash light apparatus comprising, in combination, a rotatable support, a switch device mounted upon said support, said switch device being adapted to open and close the electric light circuit of the said apparatus, yielding means for holding said support in position to close the said switch device, a bent strip extending transversely of and in spaced relation to the said support, means mounted upon the said support and contacting with the concaved side of the said strip, means operating immediately upon the passage of a current through the circuit controlled by the said switch to cause a quick straightening movement of the said strip to effect rotation of the said rotatable support in a direction to open the said switch member, and means mounted upon said support for regulating the opening movements of said switch device.

11. A switch structure for an electric flash light apparatus, comprising, in combination, a wire included within a flash light circuit, the said wire being adapted to be heated upon the flow of current therethrough and linear expansion thereby effected, means for rigidly supporting the said wire at its opposite ends, a member which is adapted to be flexed having connection at one end to said wire and at its opposite end to a stationary support, the said member extending in a direction transversely of the said wire, a flexible strip connected at one end to the said member at a point intermediate its ends and at its opposite end to a stationary support, means acting upon the said wire and upon the said member to cause flexing of the latter in one direction upon expansion of the said wire, an oscillatable support, a contact carried by said support which contact is included within the said flash light circuit, and means intermediate the said flexible strip and the said support whereby upon the flexing of the said member to cause flexing of the said flexible strip an impulse of rotation is imparted to the said oscillatable support whereby the movement of the said contact into open and closed positions is effected.

12. A switch structure for an electric flash light apparatus, comprising a wire which is included within the circuit of an electric flash light, the said wire being adapted to be heated and thereby expanded linearly upon the flow of electric current therethrough, means for rigidly supporting the said wire at its opposite ends, a member which is adapted to be flexed, one end of which is secured to the said wire and the opposite end to a support, the said member being bent outwardly, a flexible strip connected at one end to the said member at a point intermediate its ends and at its opposite end to an adjustable support, said strip being held in flexed condition, yielding means located upon the opposite side of the said wire from the said member and in alinement with the latter, the said means exerting pressure against the said wire to hold the same under tension and to effect flexing thereof upon the flow of current therethrough by which it is heated and expanded, an oscillatable supporting member located in operative relation to the said flexible strip, a contact supported by the said oscillatable member, and means interposed between the said oscillatable member and the said strip whereby upon flexing of the latter by the flexing actuation of the first named member an impulse of rotation is given to the said oscillatable member whereby opening and closing movements are imparted to the said contact.

13. A switch structure for an electric flash light apparatus, comprising, in combination, a resistance wire which is included within the circuit of an electric flash light apparatus, which wire is adapted to expand upon the flow of an electric current therethrough, means for rigidly supporting the said wire at its opposite ends, yielding means acting transversely of the said wire to hold the same under tension, a member having connection at one end to the said wire at a point in opposed relation to the said yielding means, the opposite end of said member being held against outward movement and the said member being bent outwardly, which member is adapted to have flexing movements imparted thereto upon the expansion and contraction of the said wire, an oscillatable supporting member, a contact carried by said supporting member which contact is located within the circuit of the said flash light, and means interposed between the said oscillatable member and the first named member whereby the flexing movements of the latter are adapted to impart oscillatory movements to the said oscillatable member to effect movements of the said contact to open and close the circuit including the said flash light.

In testimony whereof I have signed my name to this specification.

GUSTAF DALÉN.